| United States Patent [19] | [11] | 4,101,425 |
|---|---|---|
| Young et al. | [45] | Jul. 18, 1978 |

[54] NON-AQUEOUS ACID EMULSION COMPOSITION AND METHOD FOR ACID-TREATING SILICEOUS GEOLOGICAL FORMATIONS

[75] Inventors: Donald C. Young, Fullerton; George P. Maly, Newport Beach, both of Calif.

[73] Assignee: Union Oil Company of California, Brea, Calif.

[21] Appl. No.: 569,890

[22] Filed: Apr. 21, 1975

[51] Int. Cl.² ............................................. C09K 3/00
[52] U.S. Cl. ............................ 252/8.55 C; 252/8.55 R; 166/307; 166/308
[58] Field of Search ................... 252/8.55 C, 8.55 R; 166/307, 308

[56] References Cited

U.S. PATENT DOCUMENTS

| 2,672,936 | 3/1954 | Bond | 252/8.55 C |
|---|---|---|---|
| 2,785,752 | 3/1957 | Bond et al. | 252/8.55 C |
| 2,910,436 | 10/1959 | Fatt | 166/307 |
| 3,402,770 | 9/1968 | Messenger | 252/8.55 B |
| 3,548,945 | 12/1970 | Gidley | 166/307 |
| 3,756,319 | 9/1973 | Holm et al. | 166/307 |

*Primary Examiner*—Benjamin R. Padgett
*Assistant Examiner*—Josephine L. Barr
*Attorney, Agent, or Firm*—Richard C. Hartman; Dean Sandford; Gerald L. Floyd

[57] ABSTRACT

A stable, non-aqueous acid emulsion composition comprising an admixture of a substantially anhydrous polyphosphoric acid-based mixture, an organic solvent, and a surfactant; and a method for increasing the permeability of siliceous subterranean geological formations.

18 Claims, 1 Drawing Figure

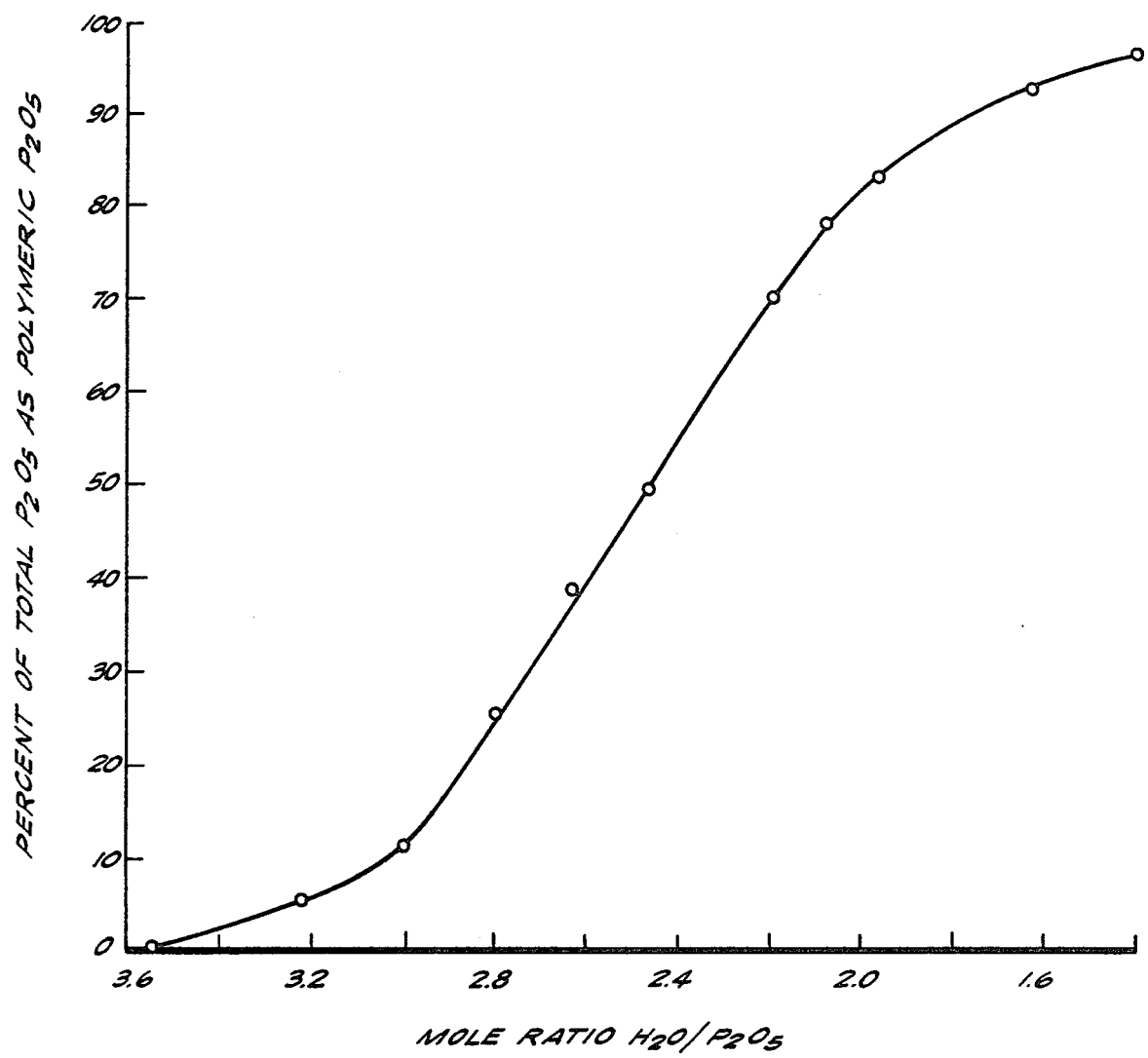

NON-AQUEOUS ACID EMULSION COMPOSITION AND METHOD FOR ACID-TREATING SILICEOUS GEOLOGICAL FORMATIONS

BACKGROUND OF THE INVENTION (1) Field of the Invention

The invention relates to the acid treatment of subterranean earth formations, and more particularly to the acid treatment of siliceous subterranean formations surrounding oil wells, gas wells, water injection wells and similar boreholes.

(2) Description of the Prior Art

Acid treatment or "acidizing" is a well-known expedient employed for rejuvenating oil-producing and gas-producing formations and to facilitate the ease with which fluid such as water, brine or gas can be injected into subterranean formations surrounding a wellbore. Acidizing of siliceous formations, e.g. sandstone, shale, serpentines, etc., has met with some favorable results when the formation is treated with hydrogen fluoride. Various modifications of this hydrogen fluoride acidizing have been disclosed in the prior art. These modifications have mainly consisted of the use of various mixtures of hydrogen fluoride and various other mineral acids such as orthophosphoric acid, fluorophosphoric acid, sulfuric acid, hydrochloric acid, etc. Although such mixtures are generally effective, experience has shown that many formations do not respond to the acid treatment.

In general, hydrocarbon-bearing siliceous formations are of a heterogeneous nature and contain a variety of inorganic materials. In addition, the pores of the formation may contain objectional deposits of organic matter such as viscous crude oil, waxes, asphaltenes and resin precipitates of petroleum origin. Conventionally, before the acidizing treatment is begun this undesirable organic matter must be removed. Solvents such as carbon disulfide, carbon tetrachloride, or an aromatic hydrocarbon are first injected into the formation surrounding the well. This solvent treatment is repeated several times until the pores of the formation are relatively free of the organic material to insure a proper acidizing environment in the formation.

Another problem common to all methods of acidizing is the production of precipitates within the formation interstices through the action of the acid-treating reagent or its byproducts on some precipitate-forming constituent of the formation. This generally occurs when the acidizing fluid is spent and precipitates in a form which plugs the pores of the producing formation. As noted above, acidizing techniques have previously employed mixtures of phosphoric acid, generally referred to as orthophosphoric acid, with other mineral acids. However, the orthophosphates of polyvalent or heavy metals are all virtually insoluble in water. For example, calcium and magnesium compounds are found in all producing formations, and when attacked by phosphoric acid mixtures form insoluble phosphates. The calcium and magnesium phosphates are especially difficult to remove and require expensive procedures to revitalize a producing formation. Therefore, there exists a need for a composition which will provide a "one shot" acidizing treatment which removes objectionable deposits of organic material, eliminating the need for a separate solvent treatment step, along with an acidic-treating reagent that does not form precipitates within the formation.

Accordingly, a principal object of this invention is to provide a novel composition and method for increasing the permeability of siliceous subterranean formations.

Another object is to provide a composition and method which remove both acid-soluble and oil-soluble components from the formation.

A further object is to provide a composition which does not form undesirable precipitates on reaction with the formation.

Other objects, advantages and features of the invention will become apparent from the following description and appended claims.

SUMMARY OF THE INVENTION

The invention relates to a non-aqueous emulsion composition for increasing the permeability of siliceous subterranean geological formations, and to a method for acidizing which dissolves organic materials and avoids the formation of insoluble inorganic precipitates and many of the other difficulties encountered in prior art acidizing methods. The invention involves the injection into the formation of a novel, non-aqueous emulsion comprising a substantially anhydrous liquid polyphosphoric acid-based mixture, an organic solvent composition, and a surface-active agent or surfactant. The acid component of the emulsion comprises about 5 to 95 weight percent of a substantially anhydrous liquid polyphosphoric acid-based mixture comprising (a) about 50 to 99 weight percent polyphosphoric acid with about 5 to 86 weight percent of the total $P_2O_5$ present as polymeric $P_2O_5$, (b) about 1 to 25 weight percent hydrofluoric acid, and (c) optionally up to 50 weight percent of a catalyst selected from the group consisting of strong mineral acids, carboxylic acids, oxidizing compounds, and mixtures thereof, in which the $H_2O/P_2O_5$ mole ratio in the overall emulsion composition is less than 3.4. The emulsion also contains about 5 to 95 weight percent of an organic solvent composition selected from the group consisting of polar solvents, hydrocarbon solvents, and mixtures thereof; and about 0.01 to 3.0 weight percent of a surfactant selected from the group consisting of cationic surfactants and nonionic surfactants.

This novel, non-aqueous emulsion composition can be utilized in both matrix acidizing and acid fracturing well stimulation procedures, and also has utility in many varied applications such as gas drying, extracting metals from ores, metal treatment, removing scale deposits from steam boilers and pipes, and particularly in methods where solvent treatment is desired along with acidizing action.

BRIEF DESCRIPTION OF THE DRAWING

The drawing is a graph illustrating the relationship of the polymeric $P_2O_5$ content of the polyphosphoric acid ingredient of the emulsion composition as a function of the mole ratio of $H_2O/P_2O_5$.

DESCRIPTION OF THE PREFERRED EMBODIMENT

The novel, non-aqueous acid emulsion of the present invention comprises an acid component, an organic solvent component and a surfactant capable of forming either an acid-in-solvent emulsion or a solvent-in-acid emulsion. The composition of the non-aqueous polyphosphoric acid-based emulsion employed in carrying out this invention will depend upon its ultimate use.

Compositions of non-aqueous acid emulsions comprising a mixture of about 5 to 95 weight percent of the acid component; about 5 to 95 weight percent of the organic solvent component; and about 0.01 to 3.0 weight percent of a anionic or nonionic surfactant are encompassed by the invention.

The non-aqueous acid emulsion compositions are prepared by: (1) adding the surfactant to the solvent component with moderate stirring, and (2) adding this surfactant-solvent mixture to the acid component with moderate stirring to form the emulsion. The rate of addition of the surfactant-solvent mixture is critical and should be slow enough so as not to break the emulsion already formed. In an alternate method the surfactant is added to the acid component with moderate stirring and then the solvent component is blended into this acid mixture. The rate of addition of components must also be controlled to avoid breaking the emulsion. These methods provide stable emulsions which can be either solvent external-acid internal or acid external-solvent internal. It is generally preferred to use the solvent external-acid internal type emulsion in treating formations. When this type of emulsion enters a formation pore the solvent first contacts and dissolves any organic material present, thus exposing the siliceous formation to the acid.

The general reactions involved in the attack of the substantially anhydrous liquid polyphosphoric-based acid emulsions of this invention upon siliceous compounds are expressed by the following equation:

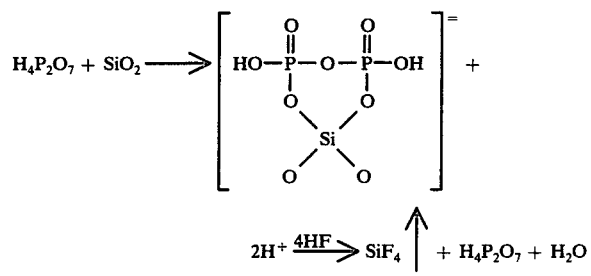

In the first step of the reaction, a phosphosilicate complex is formed. Under anhydrous conditions the soluble phosphosilicate complex then reacts with hydrofluoric acid to produce a gas, silicon tetrafluoride, and to regenerate polyphosphoric acid and water. The overall concept of this invention is that the acid component rapidly dissolves the silica and complexes other metals such as aluminum, iron, cobalt, nickel, copper, zinc, and the like. Polyphosphoric acid mixtures having a mole ratio of water to phosphorus pentoxide ($H_2O/P_2O_5$) of between about 2.1 and 3.4, and particularly between about 2.2 and 2.8, form soluble complexes with most cations. Furthermore, the polyphosphate complexes are stable after neutralization. The in situ formation of gaseous silicon tetrafluoride provides the additional benefit of sweeping and carrying undissolved solids away from the reaction zone. The micron-sized bubbles of gaseous silicon tetrafluoride are able to transport the undissolved particles of debris through the formation without plugging or bridging. Excess polyphosphoric acid is required to remove the ambient and produced water in order to keep the system in an anhydrous condition, i.e., maintaining the mole ratio of water to phosphorus pentoxide in the overall acid mixture below 3.4 and in emulsion form.

In the treatment of subterranean formations, a novel, non-aqueous emulsion composition is injected into a well and into contact with a siliceous subterranean formation containing a solid or semi-solid accumulation of hydrocarbons within the formation pores. This novel, non-aqueous emulsion composition constitutes a "one shot" treatment with the solvent component removing the undesirable hydrocarbon accumulations from the pores of the formation, thus preconditioning the formation for the attack of the acid component of the emulsion. The emulsion is stable at temperatures existing in the well but subject to being broken by either contacting the pore-plugging hydrocarbons or reacting with the silica formation.

In accordance with this invention, the exact emulsion used will depend largely upon the particular type of formation to be acidized. In predominantly siliceous geological formations containing sandstone, shale or other siliceous rock compositions, the acid component comprises about 5 to 95 weight percent of a mixture comprising about 50 to 99 weight percent polyphosphoric acid with about 5 to 86 weight percent of the total $P_2O_5$ present as polymeric $P_2O_5$, about 1 to 25 weight percent of hydrofluoric acid, and optionally up to 50 weight percent of a catalyst selected from the group consisting of strong mineral acids, organic carboxylic acids and oxidizing compounds, where the $H_2O/P_2O_5$ mole ratio in the overall emulsion composition is between about 2.1 and 3.4. The solvent component constitutes about 5 to 95 weight percent of a solvent blend comprising (a) about 35 to 80 weight percent of a normally liquid aliphatic hydrocarbon distillate boiling within the range of about 120° to 550° F., (b) about 4 to about 40 weight percent of a normally liquid aromatic hydrocarbon, (c) about 0.5 to 6 weight percent of an ether of an aliphatic polyhydric alcohol, and (d) about 1 to 12 weight percent of a lower alkyl monohydric alcohol. The emulsion also contains about 0.01 to 3.0 weight percent of a cationic or nonionic surfactant.

The preferred acid emulsions employed in treating siliceous formations comprise: (1) about 25 to 75 weight percent of an acid component comprising (a) substantially anhydrous liquid polyphosphoric acid having about 40 to 75 weight percent of the total $P_2O_5$ present as polymeric $P_2O_5$, (b) about 2 to 8 weight percent of hydrofluoric acid, and (c) optionally, 2 to 40 weight percent of a catalyst selected from strong mineral acids, carboxylic acids, and oxidizing compounds; (2) about 25 to 75 weight percent of a solvent component comprising (a) about 40 to 65 weight percent of a normally liquid aliphatic hydrocarbon distillate boiling within the range of 120° to 550° F., (b) about 10 to 30 weight percent of a normally liquid aromatic hydrocarbon, (c) about 1 to 5 weight percent of an ether of an aliphatic polyhydric alcohol and (d) about 2 to 10 weight percent of an alkyl monohydric alcohol; and (3) about 0.1 to 1.0 weight percent of a cationic or nonionic surfactant, and in which the $H_2O/P_2O_5$ mole ratio in the overall emulsion composition is between 2.2 and 2.8.

In mixed formations, i.e., formations containing calcareous materials in admixture with siliceous materials, particularly those formations containing less than 15 percent calcareous material, it is preferred that the substantially anhydrous liquid acid emulsion composition also contains hydrochloric acid to aid in dissolving the calcareous materials. However, it is also preferred that these emulsions contain less acid component than those previously described for use with predominantly siliceous formations. In treating mixed formations there is more danger of a plugging material being precipitated when the acid spends on the formation than in treating predominantly siliceous formations.

The compositions employed in treating mixed formations broadly comprise the same ingredients and proportions as are utilized in treating siliceous formations except that the acid component is present in about 5 to 75 weight percent and the solvent component is present in about 25 to 95 weight percent. Similarly, the preferred compositions for use in treating mixed formations comprise the same ingredients and proportions as are preferred for treating siliceous formations except that the acid component is present in about 20 to 50 weight percent and the solvent component is present in about 50 to 80 weight percent.

The hydrofluoric acid component may be prepared in situ by adding crystalline ammonium bifluoride to hydrochloric acid. The hydrogen chloride reacts with the bifluoride salt to form hydrogen fluoride. The more salt added, the greater will be the hydrogen fluoride concentration and the lower will be the hydrogen chloride concentration. Other preparative methods, including the mixing of hydrofluoric and hydrochloric acid solutions, can be employed. The use of such mixed acids is generally preferred.

The major ingredient of the acid component in the emulsion composition is polyphosphoric acid. Polyphosphoric acid is a generic term used to define the phosphoric acids having less water of constitution than orthophosphoric acid. Orthophosphoric acid contains one atom of phosphorus per molecule and has a theoretical mole ratio of water to phosphorus pentoxide of 3.0 or greater. Polyphosphoric acids have two or more atoms of phosphorus in a chain or ring structure in alternating sequence with oxygen, and a theoretical mole ratio of water to phosphorus pentoxide of less than 3. Polyphosphoric acid has two general forms, the acyclic and cyclic. The latter is commonly referred to as metaphosphoric acid. In the acyclic form, which is derived by limited molecular dehydration of orthophosphoric acid, the individual chains of phosphorus and oxygen atoms have terminal ends and a theoretical mole ratio of water to phosphorus pentoxide of between 2 and 3. In metaphosphoric acid, which is derived from the acyclic form by continued molecular dehydration, the chain is endless, forming ring structures. Metaphosphoric acids have theoretical mole ratios of water to phosphorus pentoxide of 2 or less. However, in some cases it is preferred that the concentration or dehydration of the orthophosphoric acid is stopped before the meta species begin to form. The reason is that the acyclic form of polyphosphoric acid is a much better complexing agent for aluminum and transition metals like iron, cobalt, nickel, copper, zinc, etc. Therefore, in geological formations which contain substantial amounts of compounds of the aforementioned metals, a polyphosphoric acid-based acidizing mixture with little or no meta polyphosphoric acid present would be most effective. Thus, the preferred acid compositions exhibit $H_2O/P_2O_5$ mole ratios above about 2.

The substantially anhydrous polyphosphoric acid component of the acid emulsion of this invention may be prepared from either furnace acid or wet process acid. The various components are introduced into a suitable vessel with agitation or stirring preferably in a closed vessel or system. Open vessels are provided with a cooling means to avoid fuming vapors which are generated by the exothermal mixing of the acid components. The composition of this invention can be obtained by any suitable method depending on the source materials used. For example, a dilute wet-process phosphoric acid is processed to polyphosphoric acid by the addition of dilute, concentrated, or fuming sulfuric acid followed by concentration of the mixture through any suitable step, such as evaporation of water or by the addition of anhydrous phosphorus pentoxide and anhydrous hydrofluoric acid. When a polyphosphoric acid having an $H_2O/P_2O_5$ mole ratio of less than 2.6 is used, it is preferred to add concentrated (98% strength) sulfuric acid to avoid dilution of the $P_2O_5$ content. On the other hand, fuming sulfuric acid, sulfur trioxide, and/or hydrofluoric acid can be added to polyphosphoric acid to obtain the proper percent of the other acids in the mixture. It is noted from the drawing that poly acid begins to form in the equilibrated acid at a mole ratio of water to $P_2O_5$ of about 3.6, i.e., an acid containing about 95 weight percent orthophosphoric acid and still containing about 5 weight percent of uncombined water. Although this composition has some free water, the acid is herein referred to as a substantially anhydrous acid since it is anhydrous in a sense that it has reached its maximum concentration of orthophosphoric acid and further concentration increases the poly acid content.

The total of $P_2O_5$ content of the non-aqueous polyphosphoric-based acid emulsion is determined by diluting a representative sample with water, adding perchloric and nitric acids and boiling the mixture to convert all forms of phosphoric acid to orthophosphoric acid. Samples are then passed over a cation exchange resin to replace the metal cations with hydrogen as these cations will interfere with subsequent analyses. The ion-exchanged sample is thereafter titrated with a strong base through two break-points, the first of which corresponds to the neutralization of the strong acids present, hydrochloric, nitric, etc., and the most strongly ionized hydrogen of the orthophosphoric acid. The second breakpoint in the titration curve occurs at a pH of about 9.5 to 10 and corresponds to neutralization of the second less strongly ionized hydrogen of the orthophosphoric acid. The difference in titer between these break-points corresponds to the total phosphate present which is reported as total $P_2O_5$.

The water content of the acid existing as water of constitution and water of dilution is determined by placing a weighted portion of the acid in a crucible with zinc oxide in excess of that needed to react with the acid. The crucible is then weighed, dried at 100° C. for one hour and placed in an oven at 500° C. for an hour. The loss in weight corresponds to the total water present in the acid mixture.

To determine the amount of orthophosphoric acid present, various analytical techniques can be employed. Regardless of the analytical method employed, prior thereto, the acid sample is prepared by dilution with water, and then acidification with concentrated sulfuric or nitric acid, followed by further dilution. Care should be taken to avoid elevated temperatures and the sample preparation should be done in an ice bath to avoid hydrolysis of the polyphosphoric acid. The resultant solution is passed over a strong acid, cation-exchange resin, e.g., Amberlite IR-120H, to remove the metallic cation impurities which interfere with subsequent analyses. Immediately after passage over the resin, the acid should be neutralized to a pH of about 3.5 to about 6.0 to reduce the tendency of polyphosphoric acid to hydrolyze. The acid is thereafter titrated to the breakpoint, falling at a pH between 9.5 and 10 corresponding to the neutralization of the second, ionized hydrogen of the orthophosphoric acid. Thereafter, an excess of a silver nitrate solution is added to precipitate silver orthophosphate and release the third, very weakly ionized hydrogen ion of the of the orthophosphoric acid. The resultant solution is then titrated to determine the amount of hydrogen ion released in the silver precipitation, and this titer value corresponding to the amount of orthophosphoric acid present in the sample which is reported on a $P_2O_5$ basis.

The amount of phosphorus pentoxide existing in the form of polyphosphoric acid can be determined by the difference between the total $P_2O_5$ present and that existing as orthophosphoric acid. When, however, the polyphosphoric acid is present in low concentrations, constituting 5 percent or less of the total $P_2O_5$ content, it is preferred to analyze for the polyphosphoric acid directly by an anion exchange chromatography method such as described by Peters and Rieman in *Analytica Chimica Octa*, 14, page 131 and by Weiner in *Journal American Oil Chemist Society*, 34, page 124.

Catalytic agents which can be used to catalyze the above-described general reaction are strong mineral acids, organic carboxylic acids and oxidizing compounds. These catalysts can be employed in concentration ranges of 0 to 50 weight percent and preferably in the range of 2 to 40 weight percent.

Strong mineral acids such as sulfuric, nitric, perchloric and hydrochloric acids or mixtures thereof can be used. One drawback with using sulfuric acid as a catalyst in acid mixtures for treating hydrocarbon formations is the possibility of sludge formation due to sulfuric acid attack on formation hydrocarbons.

However, for the other utilities mentioned above, sulfuric acid is preferred for, in addition to the catalytic effect, it aids in dehydration and depresses the freezing point of polyphosphoric acid to yield a final product having a freezing point of less than about 30° F., thereby insuring that the mixture is liquid at ambient temperatures. Furthermore, sulfuric acid has an additional and surprising effect on the viscosity of the phosphoric acid for it reduces the acid viscosity by 50 to 75 percent at concentrations of about 20 to 40 weight percent based on 100-percent-strength sulfuric acid, thereby allowing the use of a polyphosphoric acid with a lower mole ratio of water to phosphorus pentoxide.

Suitable organic carboxylic acids useful as catalysts in the above-described reaction are those that form water-soluble or acid-soluble salts of alkali metals and alkaline earth metals. For example, formic, acetic, chloroacetic, peracetic, trichloroacetic, citric, oxalic and maleic acids can be used.

Typical oxidizing compounds which can be employed according to this invention include hydrogen peroxide, potassium chromate, potassium permanganate and chromic acid.

The organic solvent component can be a hydrocarbon solvent, halogenated hydrocarbon, or a polar solvent or mixtures thereof.

Hydrocarbon solvents such as petroleum solvents, petroleum ether, petroleum naphtha, gasoline, petroleum spirit, varnish makers' and painters' naphtha, mineral spirit, kerosene, turbine fuel, high solvency petroleum naphthas, butanes, 2,2-dimethylbutane, n-hexane, isohexane, n-heptane, isooctane, isoheptane, pentene-1, pentene-2, mixed pentenes, isoheptene, isooctenes, naphthas, benzene, toluene, toluene substitutes, xylene, solvent naphthas, ethylbenzene, diethylbenzene, isopropylbenzene, amylbenzene, diamylbenzene, triamylbenzene, tetraamylbenzene, dikerylbenzene-12, amyltoluene, cyclohexane, methylcyclohexane, tetrahydronaphthalene, decahydronaphthalene, diphenyl, coal-tar creosote, turpentine, terpene solvents, dipentene, pinene, p-cymene, p-menthane, pine oils, tall oils and crude oils are suitable.

Halogenated hydrocarbons such as methyl bromide, methyl chloride, dichloromethane, chloroform, carbon tetrachloride, ethyl chloride, ethylene dibromide, ethylene chlorobromide, ethylene dichloride, dichloroethylene, B-trichloroethane, trichloroethylene, trichloroethane, tetrabromoethane, 1,1,2,2-tetrachloroethane, tetrachloroethylene, pentachloroethane, hexachloroethane, isopropyl chloride, allyl chloride, propylene dichloride, mixed amyl chloride, n-amyl chloride, dichloropentanes, n-hexyl chloride, monochlorohydrin, dichlorohydrin, epichlorohydrin, glycerol alpha-monochlorohydrin, glycerol alpha,-gamma dichlorohydrins, monobromobenzenes, dibromobenzene, monochlorobenzene, o-dichlorobenzene, trichlorobenzene, a-chloronaphthalene, monoamyl chloronaphthalene, diamyl chloronaphthalene, dichloroethyl ether, dichlorodiisopropyl ether, triglycol dichloride, halowax oils, dichlorodifluoromethane, difluorochloroethane, fluorodichloromethane, fluorotrichloromethane, trifluorotrichloroethane, dichlorotetrachloroethane and ethylidene fluoride can be used.

Polar solvents and mixtures thereof which can be employed include alcohols, ketones, ethers and esters. Alcohols such as methanol, ethanol, n-propyl alcohol, isopropanol, n-butanol, isobutyl alcohol, sec-butanol, tert-butanol, fusel oil, amyl alcohol, pentasol, n-amyl alcohol, sec-amyl alcohol, sec-n-amyl alcohol, methyl amyl alcohol, 2-ethylbutyl alcohol, heptanol-2, heptanol-3, 2-ethylhexanol, capryl alcohol, nonyl alcohol, nonyl alcohol derivatives, diisobutyl carbinol, n-decanol, undecanol, trimethylnonyl alcohol, tetradecanol, heptadecanol, phenol, benzyl alcohol, cyclohexanol, methylcyclohexanol, trimethylcyclohexanol, 4-tert-amyl cyclohexyl alcohol, 4-tert-amyl cyclohexyl alcohol, dimethyl tolyl carbinol, furfuryl alcohol, tetrahydrofurfuryl alcohol, ethylene glycol, propylene glycol, diethylene glycol, dipropylene glycol, trimethyl glycol, triethylene glycol, polyethylene glycols, polypropylene glycol 150, 2-methyl-2,4-pentane-diol, glycerol, terpene alcohol, alphaterpineol, fenchyl alcohol and hydroabietyl alcohol are useful.

Ketones such as acetone, methyl acetone, methyl ethyl ketone, methyl n-propyl ketone, methyl isobutyl ketone, methyl n-amyl ketone, ethyl butyl ketone, di-n-propyl ketone, methyl hexyl ketone, diisobutyl ketone, kiacetone alcohol, acetonyl acetone, mesityl oxide, cyclohexanone, methyl cyclohexanone, isophorone, and fenchone are suitable.

Ethers including ethyl ether, isopropyl ether, n-butyl ether, diamyl ether, n-hexyl ether, ethylene glycol monomethyl ether, "Cellosolve", ethylene glycol mono-n-butyl-ether, ethylene glycol monophenyl ether, ethylene glycol monobenzyl ether, "Dowanol" 4, "Dowanol" 3, diethylene glycol monomethyl ether, diethylene glycol monoethyl ether, diethylene glycol monobutyl ether, "Dowanol" 2, diethyl acetal, 1,2-propylene oxide, 1,4-dioxane, methylal, 2-methyl furan tetrahydrofurane, 2,3-dihydropyran, pentamethylene oxide, trioxane, terpinyl methyl ether, terpinyl ethylene glycol ether, dichloroethyl ether, triglycol dichloride, glyderyl α-monomethyl ether, glyceryl α, γ-dimethyl ether, glyceryl α-mono-n-butyl ether, glyceryl α-monoisoamyl ether, and glyceryl α- γ-diisoamyl ether can be used.

Examples of esters which can be employed include methyl acetate, ethyl acetate, n-propyl acetate, isopropyl acetate, n-butyl acetate, sec-butyl acetate, isobutyl acetate, amyl acetate, sec-amyl acetate, pentacetate, methyl amyl acetate, 2-ethyl butyl acetate, cyclohexyl acetate, methyl cyclohexanyl acetate, ethylene glycol monoacetate, glycol diacetate, ethylene glycol monomethyl ether acetate, ethylene glycol monoethyl ether acetate, methoxy butyl acetate, methyl propionate, ethyl propionate, n-butyl propionate, amyl propionate, ethyl butyrate, methyl butyrate, n-butyl butyrate, ethyl hydroxy-iso-butyrate, diethyl carbonate, diethyl oxalate, dibutyl oxalate, diamyl oxalate, methyl formate, ethyl formate, butyl formate, amyl formate, methyl lactate, ethyl lactate, butyl lactate, amyl formate and ethyl silicate.

The surface-active agents or surfactants which can be employed in the practice of this invention are anionic surfactants, nonionic surfactants and combinations thereof. Suitable anionic surfactants are sulfonates characterized by the following generalized formula:

$$MSO_3R;$$

organo-sulfates characterized by the following generalized formula:

$$MSO_4R;$$

organo-phosphates characterized by the following generalized formula:

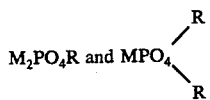

wherein M is a cation, exemplary of which are hydrogen and alkali metals, such as sodium, potassium and lithium, and wherein R is a lipophilic organic group containing up to 200 carbon atoms, and usually containing from about 6 to 100 carbon atoms, and which may also contain some hydrophilic functional groups, exemplary of which are alkyl, aryl, alkylaryl, alkenyl, alkenylaryl, alkylester, alkylpolyester, alkylether, alkylarylpolyether, cycloalkyl, naphyl, alkylmercaptyl, anthryl and alkylanthryl groups; and animal fat, vegetable oil, fatty acid and rosin derivatives.

Exemplary of the surface-active agents that can be employed in the practice of this invention are commercial surfactants, listed in Table 1.

TABLE 1

| Company | Trademark | Chemical |
|---|---|---|
| | Nonionic Ethers | |
| Wyandotte Chem. Corp. | Pluronic L/62 | Polyoxyethylene, Polyoxypropylene |
| Wyandotte Chem. Coorp. | Pluronic L/64 | Polyoxyethylene, Polyoxypropylene |
| Rohm & Haas | Triton X-35 | Octylphenoxy, Polyoxyethylene ethanol |
| Rohm & Haas | Triton X-45 | Octylphenoxy, Polyoxyethylene ethanol |
| Rohm & Haas | Triton X-100 | Octylphenoxy, Polyoxyethylene ethanol |
| Rohm & Haas | Triton X-165 | Octylphenoxy, Polyoxyethylene ethanol |
| Rohm & Haas | Triton X-305 | Octylphenoxy, Polyoxyethylene ethanol |
| Retzloff Chem. | Retzonal NP-100 | Alkylphenoxy, Polyoxyethylene ethanol |
| Thompson-Hayward Chem. | T-mulz 391 | Alkylphenoxy, Polyoxyethylene ethanol |
| Trylon Chemicals | Emgard 2030 | Alkylphenoxy, Polyoxyethylene ethanol |
| | Nonionic Esters | |
| Armour Ind. Chem. | Ethofat 0/15 | Polyethoxylated fatty acids |
| Armour Ind. Chem. | Ethofat C/15 | Polyethoxylated fatty acids |
| Atlas Chem. Ind. | Span 20 | Sorbitan monolaurate |
| | Span 60 | Sorbitan monostearate |
| Atlas Chem. Ind. | Tween 85 | Polyoxyethylene sorbitan trioleate |
| Baker Caster Oil Co. | Surfactol | Glycerol monoricinoleate |
| Baker Caster Oil Co. | Surfactol 365 | Ethoxylated caster oil |
| | Anionic Sulfonates | |
| General Aniline & Film Corp. | Igepon AC-78 | Coconut oil acid, esters of sodium isethionate |
| General Aniline & Film Corp. | Igepon TN-74 | Sodium N-methyl-N-palmitoyl taurate |
| General Aniline & Film Corp. | Igepon TE-42 Tallow | Sodium N-methyl-N-acid taurate |
| American Cyanamid | Aerosol OT | Dioctylester sodium sulfosuccinic acid |
| Mona Ind. Inc. | Monawet DC-70 | Dioctylester sodium sulfosuccinic acid |
| Calif. Chem. | Ornite No. S | Alkylaryl sodium sulfonate |
| Monsanto Co. | Santonerse D | Alkylaryl sodium sulfonate |
| | Anionic Sulfates | |
| E.I. du Pont de Nemours & Co. | Dupanol C | Sodium lauryl sulfate |
| E.I. du Pont de Nemours & Co. | Dupanol L-144 | Sodium alkylaryl sulfate |
| | Anionic Phosphates | |
| General Aniline & Film Corp. | Gafac PE-510 | Free acid of a complex organic phosphate ester |
| General Aniline & Film Corp. | Gafac RE-610 | Free acid of a complex organic phosphate ester |
| General Aniline & Film Corp. | Gafac MC-470 | Sodium slate of a complex organic phosphate ester |
| | Anionic Miscellaneous | |
| Hercules Inc. | Dresinate 731 | Sodium soap of a modified rosin |

Other additives such as acid inhibitors are not normally required in the emulsion. For example, at temperatures below 160° F. acid inhibitors are not necessary. However, if additives are employed, they should be compatible with the acid mixture. Suitable inhibitors useful above this temperature may include inorganic arsenic compounds and acetylenic alcohols, thiophenols, heterocyclic nitrogen compounds, substituted thioureas, rosin amine derivatives, quaternary ammonium compounds and similar organic agents.

The substantially anhydrous liquid phosphoric acid-based emulsions of this invention can be used in both matrix acidizing and fracture acidizing. In matrix acidizing, the method of this invention is carried out by injecting the acid solution to be used into the producing formation surrounding the well. The injection pressure is kept below that necessary to fracture the formation so that penetration of the acid into the formation matrix occurs. The injection rate selected should be generally sufficient to keep the pressure below that necessary to fracture the formation. The acid component of the invention has a high solubility for siliceous formations resulting in products which are either solubilized or chelated in the form of low viscosity solutions. After the acid component has remained in contact with the exposed formation surfaces for a time sufficient to react therewith and to enlarge the formation passages, the low viscosity reaction effluent is flushed from the formation. Generally a spacer fluid, such as a low-boiling, low aromatic-containing aliphatic hydrocarbon, e.g., diesel oil, turbine fuel, etc., is injected followed by the injection of an after-flush fluid such as filtered crude oil, low calcium-containing water, etc. Injection of the after-flush fluid displaces the spacer fluid and the low viscosity reaction effluent and is continued until the desired quantity is introduced. The well may be returned to production as soon after the after-flush has been injected as is practicable.

The acid emulsions of this invention exhibit high viscosities under most reservoir conditions and are particularly useful in fracture acidizing; which treatment, due to much lower fluid loss, promotes the formation of larger fractures and greater penetration than do the conventional fracturing techniques. Additional benefits derived from the high viscosity characteristics of the acid mixtures of this invention is that gelling agents need not be added to the acidizing mixture, and the use of diverting agents in the acidizing operation may be avoided. Conventional fracture acidizing equipment may be used in this operation. As mentioned above, because of the high viscosity characteristics, the acid emulsions of this invention can function as both the fracturing fluid and the acidizing reagent. Conventional propping agents can be used. In some instances, it is desirable to employ a graded sand of uniform spherical granular configuration such as a 20–40 mesh silica sand. This sand is retained within the fractured crevices after the acid mixture has been flushed therefrom and functions as a propping agent to retain the formation in a fractured condition.

The use of the acid emulsion of this invention results in a greater increase in the permeability of the siliceous formation than if a slug of the acid component is either preceded or followed by a slug of the solvent component. The emulsion is composed primarily of an intimate mixture of an acid phase and a solvent phase. When the emulsion contacts the formation each pore invaded by the emulsion will be exposed to acid and solvent at the same time. This insures maximum unplugging and enlargement of the affected pores. If the acid component and solvent component are injected as alternate slugs, they do not necessarily enter the same formation pores due to their differing viscosities and wetting characteristics, and certainly are not available for permeability-increasing action at the same time. Thus, the overall increase in permeability of the formation is not as great as when the acid emulsion is used.

The acid emulsion is also effective in fingering into the formation for only a short distance and then diverting itself to form other short fingers. The acid emulsion is initially quite viscous. As the emulsion comes into contact with formation rock for the first time, the surfactant emulsifying agent tends to partially adsorb on the formation rock. This sharply lowers the viscosity of that leading portion of the acid emulsion which is depleted in surfactant and allows this portion to penetrate or finger into the formation rock more easily. However, as soon as a finger has formed, the next portion of acid emulsion entering the finger encounters formation rock onto which surfactant has already been adsorbed. Thus, this next portion of acid emulsion retains its high viscosity since its surfactant concentration is not depleted. This plugs the finger, discourages its further lengthening, and diverts the acid emulsion into fresh formation which has not previously been exposed to the acid emulsion.

The invention is further described by the following examples which are illustrative of specific modes of practicing the invention as defined by the appended claims.

EXAMPLE 1

The substantially anhydrous acid emulsion of the present invention is prepared by adding 9.8 gallons of an ethoxylated castor oil (Surfactol 395) to 3,022 gallons of an organic solvent admixture in a suitable mixing tank. The organic solvent is an admixture of 76.0 weight percent of turbine fuel Jet A, 21.0 weight percent of toluene, 1.1 weight percent of ethylene glycol monobutyl ether, and 1.9 weight percent of isopropanol. Next, this solvent-surfactant mixture is added, with moderate stirring, to 900 gallons of an acid mixture comprising 82 weight percent of polyphosphoric acid (83 weight percent $P_2O_5$, 95 weight percent polymeric $P_2O_5$), 7 weight percent of hydrofluoric acid (70% concentration) and 11 weight percent of hydrochloric acid (37% concentration) in a stainless steel mixing tank equipped with a stirrer and a circulating water jacket. The rate of addition is controlled to prevent breaking the emulsion already formed. This emulsion contains 60 weight percent of the organic solvent component, 0.25 weight percent of the surfactant component, and 40 weight percent of the acid component; and the $H_2O/P_2O_5$ mole ratio of the overall emulsion is 2.7. The emulsion, thus prepared, is shipped to the well site.

EXAMPLE 2

A gravel-packed well completed in a sandstone formation designed for the production of 200 barrels of high viscosity crude petroleum would produce only 10 percent of design capacity. After the production is stopped, the well is treated in accordance with the invention by injecting 4,000 gallons of the emulsion described in Example 1 at a maximum differential pressure of 150 psi. The following 3,000 gallons of the emulsion are injected at a rate of ½ to 2 barrels per minute and at pressures below the fracturing pressure. After the acid treatment is complete, 20 barrels of turbine fuel Jet A, followed by 10 barrels of filtered brine, are injected as an after-flush. This stimulation treatment results in an immediate increase in petroleum production of 160 barrels per day.

EXAMPLE 3

This example illustrates the use of the method of the invention in fracture-acidizing a subterranean oil-producing formation. A production well is completed in a sandstone formation with perforations in the interval between 2,722 and 3,075 feet, and begins producing only 1 barrel of oil and 44 barrels of water per day. Following the preparation of the emulsion described in Example 1, injection operations are commenced. The emulsion is injected into the well until about 6,000 gallons have been introduced. The pressure initially increases and then falls off, indicating that the formation has broken down and that the fracture has been initiated. This initial volume of acid emulsion is followed immediately with 3,000 gallons of 40-gravity lease crude containing about 4 pounds per gallon of small, solid particles of sand suspended therein as a propping agent. An additional volume of 3,000 gallons of the acid emulsion is then injected. The second and third stages of the fracturing operation are performed using the emulsion compositions and volumes employed in the first stage.

The injection rate of the emulsion fracturing fluid is between about 10 and 16 barrels per minute, and the wellhead pressure ranges from about 4,700 to 5,500 psi for the first stage, and between about 5,000 and 6,000 psi for the second and third stages.

Following the treatment, the well is shut in overnight. When the well is returned to production, it initially flows at the rate of 345 barrels of oil and 330 barrels of water per day. A week after the acid emulsion treatment, the average production is 360 barrels of oil and 263 barrels of water per day.

While particular embodiments of the invention have been described, it will be understood, of course, that the invention is not limited thereto since many modifications can be made and it is intended to include within the invention such modifications as are within the scope of the claims.

The invention having thus been described, we claim:

1. A substantially anhydrous emulsion comprising: (1) about 5 to 95 weight percent of an acid component comprising (a) about 50 to 99 weight percent of polyphosphoric acid having about 5 to 86 weight percent of the total $P_2O_5$ present as polymeric $P_2O_5$, and (b) about 2 to 8 weight percent of hydrofluoric acid; (2) about 5 to 95 weight percent of an organic solvent component; (3) about 0.01 to 3.0 weight percent of an anionic or nonionic surfactant component; and wherein the $H_2O/P_2O_5$ mole ratio of the overall emulsion is less than 3.4.

2. The composition defined in claim 1 wherein said acid component includes an amount up to about 50 weight percent of a catalyst selected from the group consisting of (a) strong mineral acids selected from the group consisting of sulfuric, nitric, perchloric and hydrochloric acids and mixtures thereof; (b) carboxylic acids selected from the group consisting of formic, acetic, chloracetic, peracetic, trichloracetic, citric, oxalic and maleic acids; and (c) oxidizing agents selected from the group consisting of hydrogen peroxide, potassium chromate, potassium permanganate and chromic acid.

3. The composition defined in claim 2 wherein said strong mineral acid is hydrochloric acid.

4. The composition defined in claim 2 wherein said strong mineral acid is sulfuric acid.

5. The composition defined in claim 1 wherein said organic solvent component is selected from the group consisting of hydrocarbon solvents, halogenated hydrocarbon solvents, polar solvents, and admixtures thereof.

6. The composition defined in claim 5 wherein said organic solvent component comprises about 35 to 80 weight percent of a normally liquid aliphatic hydrocarbon boiling in the range of about 120° to 550° F.; about 4 to 40 weight percent of a normally liquid aromatic hydrocarbon; about 0.5 to 6 weight percent of an ether of an aliphatic polyhydric alcohol; and about 1.0 to 12 weight percent of a lower alkyl monhydric alcohol.

7. The composition defined in claim 1 comprising about 25 to 75 weight percent of said acid component, about 25 to 75 weight percent of said organic solvent component, and about 0.1 to 1.0 weight percent of said surfactant component.

8. A substantially anhydrous emulsion comprising: (1) about 25 to 75 weight percent of an acid component comprising (a) about 50 to 99 weight percent of polyphosphoric acid having about 40 to 75 weight percent of the total $P_2O_5$ present as polymeric $P_2O_5$, (b) about 2 to 8 weight percent of hydrofluoric acid and (c) about 2 to 40 weight percent of a catalyst selected from the group consisting of (a) strong mineral acids selected from the group consisting of sulfuric, nitric, perchloric and hydrochloric acids and mixtures thereof; (b) carboxylic acids selected from the group consisting of formic, acetic, chloracetic, peracetic, trichloracetic, citric, oxalic and maleic acids; and (c) oxidizing agents selected from the group consisting of hydrogen peroxide, potassium chromate, potassium permanganate and chromic acid. (2) about 25 to 75 weight percent of an organic solvent composition comprising (a) about 40 to 65 weight percent of a normally liquid aliphatic hydrocarbon boiling in the range of about 120° to 550° F., (b) about 10 to 30 weight percent of a normally liquid aromatic hydrocarbon, (c) about 1 to 5 weight percent of an ether of an aliphatic polyhydric alcohol, and (d) about 2 to 10 weight percent of a lower alkyl monhydric alcohol; (3) about 0.1 to 1.0 weight percent of an anionic or nonionic surfactant component; and wherein the $H_2O/P_2O_5$ mole ratio of the overall emulsion is between about 2.2 and 2.8.

9. The method for increasing the permeability of a siliceous subterranean geological formation penetrated by a well which comprises introducing through said well and into the formation surrounding said well at a pressure below the fracturing pressure a substantially anhydrous emulsion comprising: (1) about 5 to 95 weight percent of an acid component comprising (a) about 50 to 99 weight percent polyphosphoric acid, said polyphosphoric acid containing about 5 to 86 weight percent of the total $P_2O_5$ present as polymeric $P_2O_5$, (b) about 1 to 25 weight percent of hydrofluoric acid, and (c) about 0 to 50 weight percent of a catalyst selected from the group consisting of (a) strong mineral acids selected from the group consisting of sulfuric, nitric, perchloric and hydrochloric acids and mixtures thereof; (b) organic carboxylic acids selected from the group consisting of formic, acetic, chloroacetic, peracetic, trichloracetic, citric, oxalic and maleic acids; and (c) oxidizing agents selected from the group consisting of hydrogen peroxide, potassium chromate, potassium permanganate and chromic acid. (2) about 5 to 95 weight percent of an organic solvent component; (3) about 0.01 to 3.0 weight percent of an anionic or nonionic surfactant; and in which the $H_2O/P_2O_5$ mole ratio is less than 3.4 in the overall acid emulsion.

10. The method defined in claim 9 wherein said acid component contains hydrochloric acid.

11. The method defined in claim 9 wherein said organic solvent component is selected from the group consisting of hydrocarbon solvents, halogenated hydrocarbon solvents, polar solvents, and admixtures thereof.

12. The method defined in claim 11 wherein said organic solvent component comprises about 35 to 80 weight percent of a normally liquid aliphatic hydrocarbon boiling in the range of about 120° to 550° F.; about 4 to 40 weight percent of a normally liquid aromatic hydrocarbon; about 0.5 to 6 weight percent of an ether of an aliphatic polyhydric alcohol; and about 1.0 to 12 weight percent of a lower alkyl monhydric alcohol.

13. The method defined in claim 9 wherein the emulsion comprises about 25 to 75 weight percent of said acid component, about 25 to 75 weight percent of said organic solvent component and about 0.1 to 1.0 weight percent of said surfactant component.

14. A method for increasing the permeability of a mixed subterranean geological formation penetrated by a wellbore which comprises hydraulically fracturing said formation by introducing into the formation a highly viscous, substantially anhydrous, liquid-acid-mixture composition, comprising: (1) about 5 to 75 weight percent of an acid component comprising (a) about 50 to 99 weight percent polyphosphoric acid, said polyphosphoric acid containing about 5 to 86 weight percent of the total $P_2O_5$ present as polymeric $P_2O_5$, (b) about 2 to 8 weight percent of hydrofluoric acid, and (c) up to about 50 weight percent of a catalyst selected from the group consisting of (a) strong mineral acids selected from the group consisting of sulfuric, nitric, perchloric and hydrochloric acids and mixtures thereof; (b) organic carboxylic acids selected from the group consisting of formic, acetic, chloracetic, peracetic, trichloracetic, citric, oxalic and maleic acids; and (c) oxidizing agents selected from the group consisting of hydrogen peroxide, potassium chromate, potassium permanganate and chromic acid. (2) about 25 to 95 weight percent of an organic solvent component; and (3) about 0.01 to 3.0 weight percent of an anionic or nonionic surfactant component; and wherein the $H_2O/P_2O_5$ mole ratio is from 2.1 to 3.4 in the overall acid emulsion.

15. The method defined in claim 14 wherein said acid component contains hydrochloric acid.

16. The method defined in claim 14 wherein said organic solvent component is selected from the group consisting of hydrocarbon solvents, halogenated hydrocarbon solvents, polar solvents and admixtures thereof.

17. The method defined in claim 14 wherein said organic component comprises about 35 to 80 weight percent of a normally liquid aliphatic hydrocarbon boiling in the range of about 120° to 550° F.; about 4 to 40 weight percent of a normally liquid aromatic hydrocarbon; about 0.5 to 6 weight percent of an ether of an aliphatic polyhydric alcohol; and about 1.0 to 12 weight percent of a lower alkyl monohydric alcohol.

18. The method defined in claim 14 comprising about 20 to 50 weight percent of said acid component, about 50 to 80 weight percent of said organic solvent component, and about 0.1 to 1.0 weight percent of said surfactant component.

* * * * *